US012811130B2

(12) United States Patent
Kim et al.

(10) Patent No.: US 12,811,130 B2
(45) Date of Patent: Nov. 24, 2026

(54) APPARATUS AND METHOD FOR MANUFACTURING SECONDARY BATTERY INCLUDING ROLL-PRESSING OF HALF-COATED ELECTRODE PLATE

(71) Applicant: Samsung SDI Co., Ltd., Yongin-si (KR)

(72) Inventors: Bohun Kim, Yongin-si (KR); Jeunggi Moon, Yongin-si (KR); Min-Sic Kim, Yongin-si (KR); Youngsan Ko, Yongin-si (KR); Hongryeol Yu, Yongin-si (KR); Joongyong Park, Yongin-si (KR); Hyosuk Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/806,568

(22) Filed: Aug. 15, 2024

(65) Prior Publication Data

US 2025/0266421 A1 Aug. 21, 2025

(30) Foreign Application Priority Data

Feb. 15, 2024 (KR) ........................ 10-2024-0021736

(51) Int. Cl.
*H01M 4/04* (2006.01)
*B05C 1/08* (2006.01)
*H01M 10/04* (2006.01)

(52) U.S. Cl.
CPC ............. *H01M 4/0435* (2013.01); *B05C 1/08* (2013.01); *H01M 4/0404* (2013.01); *H01M 10/0409* (2013.01)

(58) Field of Classification Search
USPC ........ 118/216–218, 227, 248, 255, 258, 261, 118/58, 60
See application file for complete search history.

(56) References Cited

U.S. PATENT DOCUMENTS

2022/0302505 A1* 9/2022 Kinoshita ........... H01M 10/058
2023/0420810 A1* 12/2023 Lee ....................... H01M 10/16

FOREIGN PATENT DOCUMENTS

JP 2013-237072 A 11/2013
JP 2016004756 A * 1/2016
(Continued)

OTHER PUBLICATIONS

English Translation JP-2016004756-A (Year: 2016).*
English Translation JP-6156070-B2 (Year: 2017).*

*Primary Examiner* — Yewebdar T Tadesse
(74) *Attorney, Agent, or Firm* — Womble Bond Dickinson (US) LLP

(57) ABSTRACT

An apparatus for manufacturing a secondary battery includes: a coating unit configured to coat a mixture of materials on a substrate of an electrode plate for an electrode assembly of a secondary battery; and a roll-pressing unit configured to roll-press the substrate on which the mixture of materials has been coated. The coating unit is configured to produce a half-coated electrode plate by coating the mixture of materials on only a single surface of the substrate, and the roll-pressing unit is configured to roll-press the half-coated electrode plate by using a first roller facing a coated surface of the half-coated electrode plate and a second roller facing an uncoated surface of the half-coated electrode plate. The first roller and the second roller have at least one different characteristic from each other.

8 Claims, 11 Drawing Sheets

(56) References Cited

FOREIGN PATENT DOCUMENTS

| | | | | |
|---|---|---|---|---|
| JP | 6156070 | B2 * | 7/2017 | |
| KR | 10-2023-0017050 | A | 2/2023 | |
| WO | WO-2018001523 | A1 * | 1/2018 | ........... C23C 14/564 |

* cited by examiner

APPARATUS AND METHOD FOR MANUFACTURING SECONDARY BATTERY INCLUDING ROLL-PRESSING OF HALF-COATED ELECTRODE PLATE

CROSS-REFERENCE TO RELATED APPLICATION

The present application claims priority to and the benefit of Korean Patent Application No. 10-2024-0021736, filed on Feb. 15, 2024, in the Korean Intellectual Property Office, the entire disclosure of which is incorporated herein by reference.

BACKGROUND

1. Field

Aspects of embodiments of the present disclosure relate to an apparatus and method for manufacturing a secondary battery including roll-pressing of a half-coated electrode plate.

2. Description of the Related Art

Different from a primary battery that is not designed to be charged, a secondary battery is designed to be discharged and recharged. Generally, a secondary battery includes an electrode assembly including (or composed of) positive/negative electrode plates and a separator. The positive/negative electrode plates may be manufactured through processes, such as press rolling, drying, slitting, and notching, after a process of coating an active material on a substrate.

An electrode assembly may be manufactured by using a winding process or a stacking process with the separator interposed between the positive/negative electrode plates.

In a process of manufacturing a secondary battery, the active material is generally coated on both surfaces of the substrate. However, for some substrates, the active material is coated on only a single surface of the substrate (e.g., the active material is not coated on both surfaces of the substrate). An electrode plate having the active material coated on only a single surface of the substrate is called a half-coated electrode plate (which can correspond to either a positive electrode or a negative electrode). A roll-pressing process improves energy density by thinning and flattening an electrode plate by compressing and drawing, by roll-pressing rollers, the electrode plate on which a mixture of materials has been coated by a coating unit, improves a coupling force between a surface of the electrode plate and the active material, and increases the output and performance of the battery by allowing for smooth movement of lithium ions.

The above information disclosed in this Background section is for enhancement of understanding of the background of the present disclosure, and therefore, it may contain information that does not constitute a related (or prior) art.

SUMMARY

When a half-coated electrode plate is pressed and rolled by rollers, it may curl toward the uncoated surface thereof. When an electrode assembly is manufactured using the curled electrode plate, a space between the electrode plates is increased due to deformation of the electrode plate which occurs due to the charging and discharging of a battery during the lifespan of the battery. Accordingly, performance and safety of the battery are adversely affected because lithium plating occurs on the electrode plates that face each other. Accordingly, embodiments of the present disclosure provide an apparatus and method for manufacturing a secondary battery by using a roll-pressing unit that reduces a curling phenomenon of a half-coated electrode plate by improving the roll-pressing unit that is used to manufacture a secondary battery.

According to an embodiment of the present disclosure, an apparatus for manufacturing a secondary battery includes a coating unit configured to coat a mixture of materials on a substrate of an electrode plate for an electrode assembly of a secondary battery and a roll-pressing unit configured to roll-press the substrate on which the mixture of materials has been coated. The coating unit is configured to produce a half-coated electrode plate by coating the mixture of materials on a single surface of the substrate. The roll-pressing unit is configured to roll-press the half-coated electrode plate by using a first roller facing a coated surface of the half-coated electrode plate and a second roller facing an uncoated surface of the half-coated electrode plate. The first roller and the second roller have at least one characteristic that are different from each other.

According to another embodiment of the present disclosure, a method of manufacturing a secondary battery includes coating a mixture of materials on a substrate of an electrode plate for an electrode assembly of a secondary battery and roll-pressing the substrate on which the mixture of materials has been coated. The coating of the mixture of materials includes producing a half-coated electrode plate by coating the mixture of materials on a single surface of the substrate, and the roll-pressing of the substrate includes roll-pressing the half-coated electrode plate by using a first roller facing a coated surface of the half-coated electrode plate and a second roller facing an uncoated surface of the half-coated electrode plate. The first roller and the second roller have at least one characteristic that are different from each other In the apparatus and method for manufacturing a secondary battery, the first roller and the second roller may be different from each other (e.g., may have at least one characteristic that is different from each other). In one embodiment, the differentiation between the first roller and the second roller may be in terms of the number of rollers. For example, the number of first rollers and the number of second rollers may be different from each other.

In other embodiments, the differentiation between the first roller and the second roller may be in terms of the size of the rollers. For example, the size of the first roller and the size of the second roller may be different from each other.

In other embodiments, the differentiation between the first roller and the second roller may be in terms of a temperature that is applied to the half-coated electrode plate by the first and second rollers. For example, the temperature of the first roller and the temperature of the second roller may be different from each other.

According to another embodiment of the present disclosure, a secondary battery is provided that is manufactured by the apparatus and method for manufacturing a secondary battery as described above.

Aspects and features of the present disclosure are not limited to those described above, and other aspects and features not specifically mentioned herein will be clearly understood by those skilled in the art from the description of the present disclosure below.

BRIEF DESCRIPTION OF THE DRAWINGS

The following drawings attached to the present specification illustrate embodiments of the present disclosure and further describe aspects and features of the present disclosure together with the detailed description of the present disclosure. Thus, the present disclosure should not be construed as being limited to the drawings, in which.

DETAILED DESCRIPTION

Figure 1:
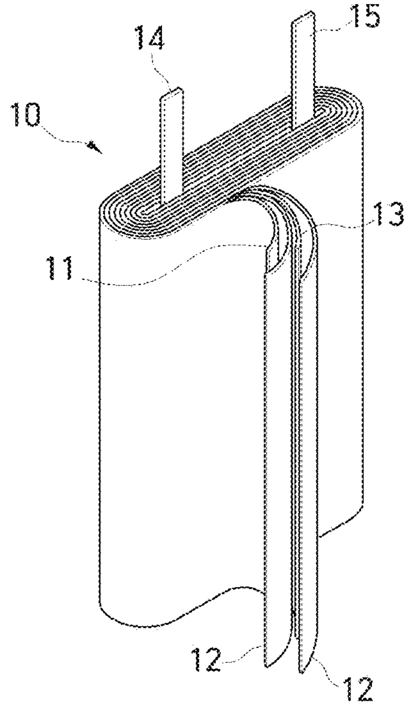
FIG. 1 schematically illustrates an electrode assembly of a secondary battery.

Hereinafter, embodiments of the present disclosure will be described, in detail, with reference to the accompanying drawings. The terms or words used in the present specification and claims are not to be narrowly interpreted according to their general or dictionary meanings and should be interpreted as having meanings and concepts that are consistent with the technical idea of the present disclosure on the basis of the principle that an inventor can be his/her own lexicographer to appropriately define concepts of terms to describe his/her invention in the best way.

The embodiments described in this specification and the configurations shown in the drawings are only some embodiments of the present disclosure and do not represent all of the aspects, features, and embodiments of the present disclosure. Accordingly, it should be understood that there may be various equivalents and modifications that can replace or modify one or more embodiments or features therein described herein at the time of filing this application.

It will be understood that if an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, if a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" if describing embodiments of the present disclosure relates to "one or more embodiments of the present disclosure." Expressions, such as "at least one of" and "any one of," if preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," if used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same." Thus, the phrase "substantially the same" may include a case having a deviation that is considered low in the art, for example, a deviation of 5% or less. In addition, if a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may contact the upper (or lower) surface of the element, and another element may also be interposed between the element and the arbitrary element located on (or under) the element.

In addition, it will be understood that if a component is referred to as being "linked," "coupled," or "connected" to another component, the elements may be directly "coupled," "linked" or "connected" to each other, or another component may be "interposed" between the components."

Throughout the specification, if "A and/or B" is stated, it means A, B or A and B, unless otherwise stated. That is, "and/or" includes any or all combinations of a plurality of items enumerated. When "C to D" is stated, it means C or more and D or less, unless otherwise specified.

The terminology used herein is for the purpose of describing embodiments of the present disclosure and is not intended to limit the present disclosure.

FIG. 1 shows an electrode assembly of a secondary battery.

Referring to FIG. 1, an electrode assembly 10 may be formed by winding or stacking a stack of a first electrode plate 11, a separator 12, and a second electrode plate 13, each of which are formed as thin plates or films. When the electrode assembly 10 is a wound stack, a winding axis may be parallel to the longitudinal direction of a case. In other embodiments, the electrode assembly 10 may be a stack type rather than a winding type, and the shape of the electrode assembly 10 is not limited in the present disclosure. In addition, the electrode assembly 10 may be a Z-stack electrode assembly in which a positive electrode plate and a negative electrode plate are inserted into both sides (e.g., opposite sides) of a separator, which is then bent (or folded) into a Z-stack. In addition, one or more electrode assemblies may be stacked (e.g., arranged) such that long sides of the electrode assemblies are adjacent to each other and accommodated in a case, and the number of electrode assemblies in a case is not limited in the present disclosure. The first electrode plate 11 of the electrode assembly may act as a negative electrode, and the second electrode plate may act as a positive electrode. Of course, the reverse is also possible.

The first electrode plate 11 may be formed by applying (e.g., coating or depositing) a first electrode active material, such as graphite or carbon, onto a first electrode substrate formed of a metal foil, such as copper, a copper alloy, nickel, or a nickel alloy. The first electrode plate 11 may include a first electrode tab 14 (e.g., a first uncoated portion), which is a region to which the first electrode active material is not applied. The first electrode tab 14 may be connected to an external first terminal. In some embodiments, when the first electrode plate 11 is manufactured, the first electrode tab 14 may be formed by being cut in advance to protrude to (or protrude from) one side of the electrode assembly 10, or the first electrode tab 14 may protrude to one side of the electrode assembly 10 more than (e.g., farther than or beyond) the separator 12 without being separately cut.

The second electrode plate 13 may be formed by applying (e.g., coating or depositing) a second electrode active material, such as a transition metal oxide, onto a second electrode substrate formed of a metal foil, such as aluminum or an aluminum alloy. The second electrode plate 13 may include a second electrode tab 15 (e.g., a second uncoated portion), which is a region to which the second electrode active material is not applied. The second electrode tab 15 may be connected to an external second terminal. In some embodiments, the second electrode tab 15 may be formed by being cut in advance to protrude to the other side (e.g., the opposite side) of the electrode assembly 10 when the second electrode plate 13 is manufactured, or the second electrode plate 13 may protrude to the other side of the electrode assembly more than (e.g., farther than or beyond) the separator 12 without being separately cut.

In some embodiments, the first electrode tab 14 may be located on (e.g., may protrude from) the left side of the electrode assembly 10, and the second electrode tab 15 may be located on (e.g., may protrude from) the right side of the electrode assembly 10. In other embodiments, the first electrode tab 14 and the second electrode tab 15 may be located on one side of the electrode assembly 10 in the same direction.

For convenience of description, the left and right sides of the electrode assembly are defined according to the electrode assembly 10 as oriented in FIG. 1, and the positions thereof may change when the secondary battery is rotated left and right or up and down.

The separator 12 prevents a short-circuit between the first electrode plate 11 and the second electrode plate 13 while allowing movement of lithium ions therebetween. The separator 12 may be made of, for example, a polyethylene film, a polypropylene film, a polyethylene-polypropylene film, or the like.

In some embodiments, the electrode assembly 10 may be accommodated in a case along with an electrolyte. In a pouch-type secondary battery, an electrode assembly 10 may be accommodated in a pouch made of flexible material (see, e.g., FIG. 2). In a cylindrical or prismatic secondary battery, an electrode assembly 10 may be accommodated in a cylindrical or prismatic metal casing (see, e.g., FIGS. 3 and 4).

Figure 2:
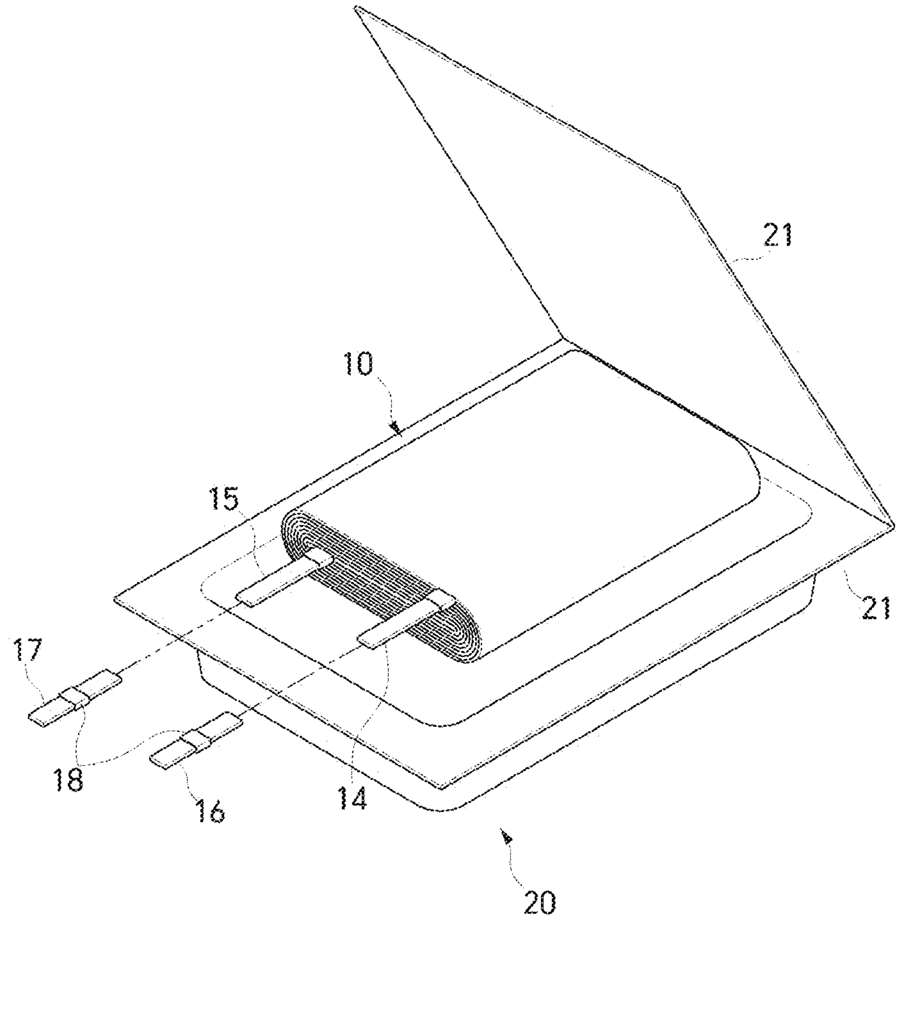
FIG. 2 schematically illustrates a pouch-type secondary battery.

FIG. 2 schematically illustrates the pouch-type secondary battery.

The pouch-type secondary battery includes an electrode assembly 10 and a pouch 20 that accommodates the electrode assembly 10.

The electrode assembly 10 may be the same as that illustrated in FIG. 1.

The first electrode tab 14 and the second electrode tab 15 of the electrode assembly may be electrically connected to respective external first and second terminal leads and 17 by welding. Each of the first terminal lead 16 and the second terminal lead may be attached with (e.g., covered by) a tab film 18 for insulation from the pouch 20.

The pouch 20 may be sealed by having sealing parts 21 at the edges thereof come into contact with each other while accommodating the electrode assembly 10 therein, and the sealing may be achieved with the tab film 18 interposed between the sealing parts 21. The sealing parts 21 of the pouch 20 may each be made of a thermal fusion material that generally exhibits weak adhesion to metal. Thus, the pouch 20 may be fused together by interposing the thin tab 18 between the sealing parts 21 to ensure a sufficient seal.

Figure 3:
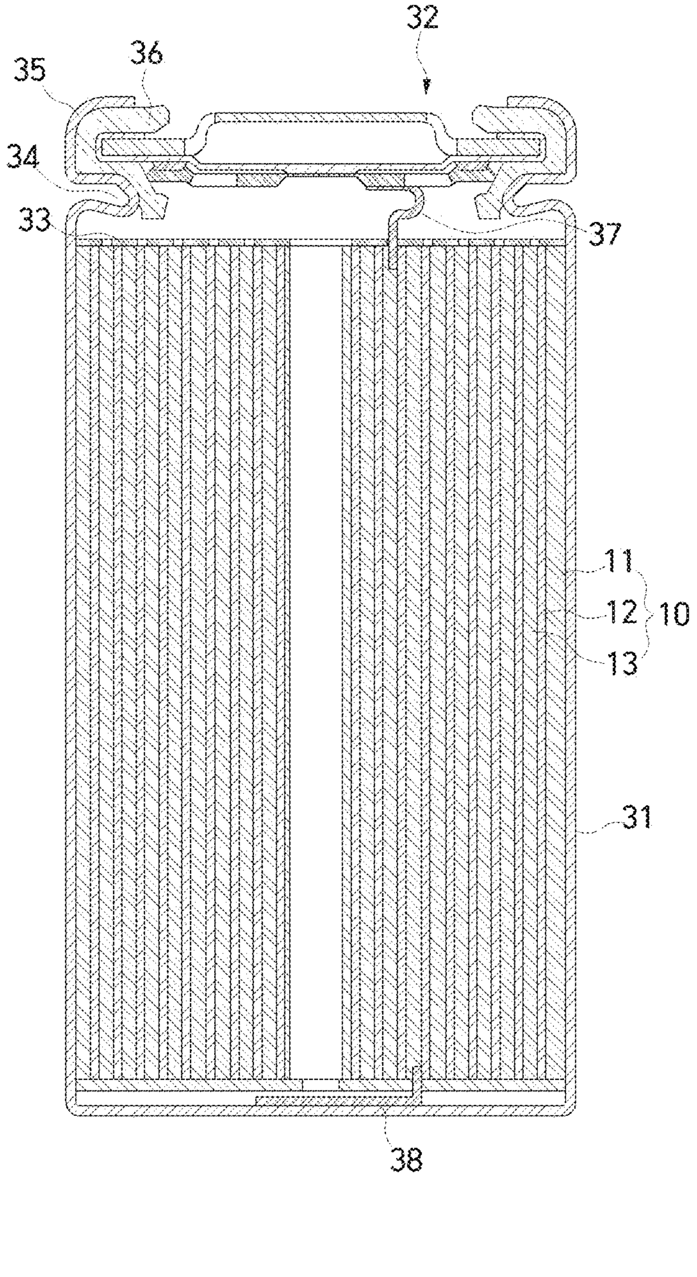
FIG. 3 is a cross-sectional view of a cylindrical secondary battery.

FIG. 3 illustrates a cylindrical secondary battery. As shown in FIG. 3, a secondary battery may include an electrode assembly 10, a case 31 accommodating the electrode assembly 10 and an electrolyte therein, a cap assembly 32 coupled to an opening in the case 31 to seal the case 31, and an insulating plate 33 positioned between the electrode assembly 10 and the cap assembly 32 inside the case 31.

The case 31 accommodates the electrode assembly 10 and the electrolyte, and, together with the cap assembly 32, forms an external appearance of the secondary battery. The case 31 may have a substantially cylindrical body portion and a bottom portion connected to one side (e.g., to one end) of the body portion. A beading part 34 (e.g., a bead) deformed inwardly may be formed in the body portion, and a crimping part 35 (e.g., a crimp) bent inwardly may be formed at an open end of the body portion.

The beading part 34 can reduce or prevent movement of the electrode assembly 10 inside the case 31 and can facilitate seating of a gasket 36 and the cap assembly 32. The crimping part 35 may firmly fix the cap assembly 32 by pressing the edge of the case 31 against the gasket 36. The case 31 may be formed of iron plated with nickel, for example.

The cap assembly 32 may be fixed to the inside of the crimping part 35 by the gasket 36 to seal the case 31. A first lead tab 37 drawn out from the electrode assembly 10 may be connected to the cap assembly 32, and a second lead tab 38 drawn out from the electrode assembly 10 may be electrically connected to the bottom of the case 31.

Figure 4:
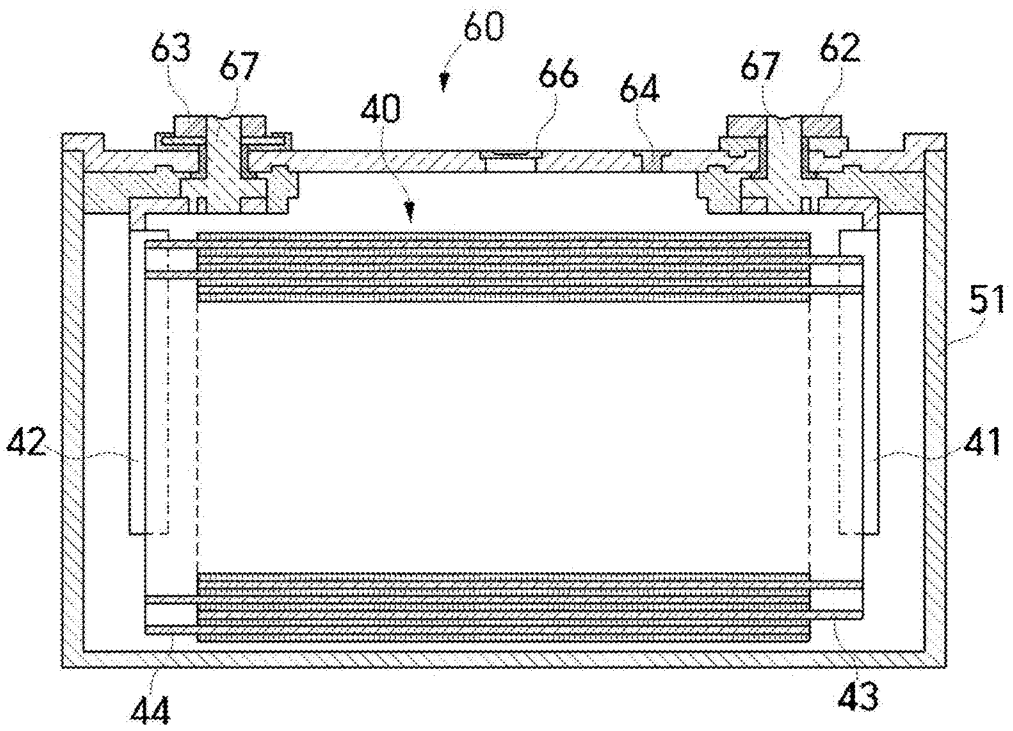
FIG. 4 illustrates an internal configuration of a prismatic secondary battery.

FIG. 4 shows an internal structure of a prismatic secondary battery.

As shown in FIG. 4, a prismatic secondary battery may include an electrode assembly 40, a first current collector 41, a first terminal 62, a second current collector 42, a second terminal 63, a case 51, and a cap assembly 60.

The electrode assembly 40 may be formed by winding or stacking a stack of a first electrode plate, a separator, and a second electrode plate, which are formed as thin plates or films. When the electrode assembly 40 is a wound stack, a winding axis may be parallel to the longitudinal direction of the case 51. In other embodiments, the electrode assembly 40 may be a stack type rather than a winding type, and the shape of the electrode assembly 40 is not limited in the present disclosure. In addition, the electrode assembly 40 may be a Z-stack electrode assembly in which a positive electrode plate and a negative electrode plate are inserted into both sides (e.g., opposite sides) of a separator, which is then bent (or folded) into a Z-stack. In addition, one or more electrode assemblies 40 may be stacked such that long sides of the electrode assemblies 40 are adjacent to each other and accommodated in the case 51, and the number of electrode assemblies 40 in the case 51 is not limited in the present disclosure. The first electrode plate of the electrode assembly may act as a negative electrode, and the second electrode plate may act as a positive electrode. Of course, the reverse is also possible.

In the electrode assembly 40, the first current collector 41 and the second current collector 42 may be welded and connected to the first electrode tab 43 extending from the first electrode plate and the second electrode tab 44 extending from the second electrode plate, respectively. As described above, in embodiments in which the first electrode tab 43 and the second electrode tab 44 are located at the top of the electrode assembly 40, the first and second current collectors are located at the top of the electrode assembly 40.

As illustrated in FIG. 4, the first current collector 41 and the second current collector 42 are connected to the first terminal 62 and the second terminal 63 through connection members 67, respectively. In some embodiments, the connection members 67 may each have an outer peripheral surface that is threaded and may be fastened to the first terminal 62 and the second terminal 63 by screwing. However, the present disclosure is not limited thereto. In other embodiments, the connection members 67 may be coupled to the first terminal 62 and the second terminal 63 by riveting or welding.

Figure 5:
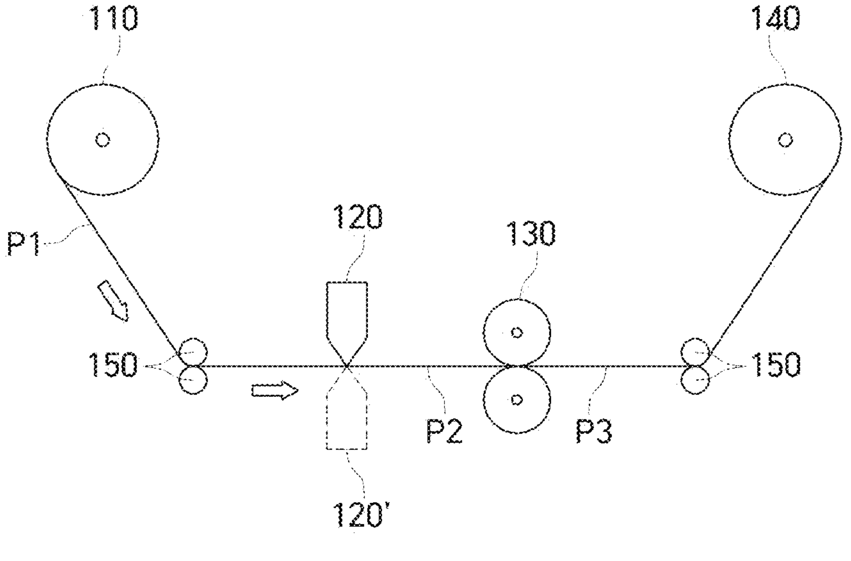
FIG. 5 is a schematic diagram describing a process of manufacturing electrode plates of the electrode assembly illustrated in FIG. 1.

FIG. 5 is a schematic diagram describing a process for manufacturing an electrode plate (e.g., the first electrode plate 11 or the second electrode plate 13) of the electrode assembly 10 illustrated in FIG. 1 or the electrode assembly 40 illustrated in FIG. 4.

A supply roll 110 is a roll on which a substrate P1 for an electrode plate is wound. When an apparatus for manufacturing electrode plates according to embodiments the present disclosure is used to manufacture a positive electrode plate, the substrate P1 may be a metal foil including (or containing) aluminum (Al), for example. Alternatively, when the apparatus for manufacturing electrode plates according to embodiments of the present disclosure is used to manufacture a negative electrode plate, the substrate P1 may be a metal foil including (or containing) copper (Cu) or nickel (Ni).

A transfer roller 150 may be an idle roller that guides the substrate P1 as it is unwounded from the supply roll 110 or a drive roller that applies a pulling force to unwind the substrate P1 from the supply roll 110. FIG. 5 illustrates an embodiment including a total of four transfer rollers 150 as an example only, and the number and positions of transfer rollers may be varied.

A coating unit 120 forms a coating layer by coating the substrate P1 with an electrode material slurry that is previously prepared. The slurry for coating includes (or contains) an active material. When the apparatus for manufacturing electrode plates according to embodiments of the present disclosure is used to manufacture the positive electrode plate, the slurry may include (or contain) an active material containing a transition metal oxide, a binder, a volatile solvent, and the like, for example. When the apparatus is used to manufacture the negative electrode plate, the slurry may be prepared with (e.g., may include) an active material containing a transition metal oxide, a binder, a solvent, or the like. Moreover, both surfaces, namely the upper and lower surfaces, of the substrate P1 may be coated (e.g., may be concurrently or simultaneously coated) by adding a second coating unit 120', having the same configuration as the coating unit 120 illustrated in FIG. 5, to the lower surface of the substrate P1.

A press unit (e.g., a rolling unit) 130 includes a rolling roller to compresses an electrode plate P2 coated with the slurry (e.g., a mixture of materials) by the coating unit 120 to produce a high-capacity and high-density secondary battery.

A winding roll 140 is a roll that winds and accommodates an electrode plate P3 coated by the coating unit 120 and rolled by the press unit 130.

In some embodiments, a drying unit may be added between the coating unit and the winding roll 140 to dry or solidify the electrode plate P2 coated with the slurry. The drying unit may include a heat source. The drying unit may be physically separated from or may be functionally integrated into the press unit 130. For example, when the press unit 130 is configured in the form of a roller, the roller may be equipped with a heat source to simultaneously heat and roll the coating layer such that the press unit 130 also acts as a drying unit.

The electrode assembly illustrated in FIG. 1 (also referred to as a jelly-roll) may be manufactured by using the electrode plate(s) manufactured by the aforementioned process. A method of manufacturing the electrode assembly may include winding and stacking. However, for increased performance (e.g., rapid charging and discharging and/or high capacity) and safety (e.g., a collision, penetration, heat exposure, and/or a battery resistant to ignition) of a secondary battery, the trend of a technology is changing from a winding process to a stacking process.

Figure 6:
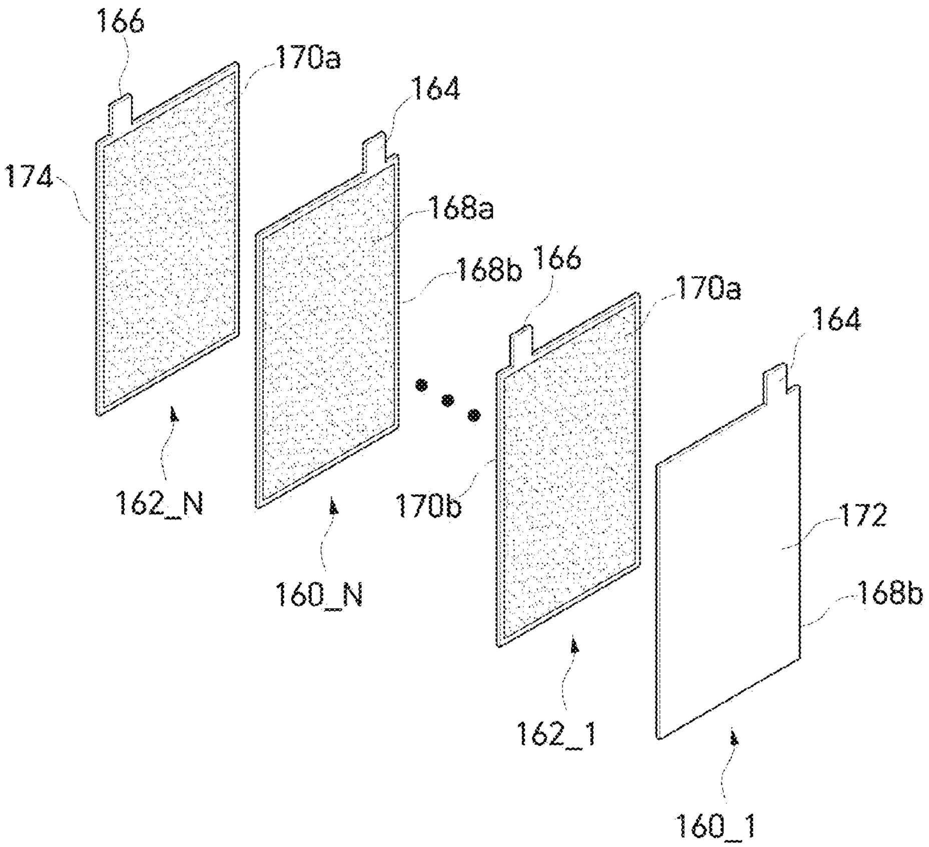
FIG. 6 schematically illustrates a process by which an electrode assembly is manufactured by stacking an electrode plate.

FIG. 6 schematically illustrates a process in which an electrode assembly is manufactured by stacking electrode plates in a stacking process. A first positive electrode plate 160_1, a first negative electrode plate 162_1, . . . , an N-th positive electrode plate 160_N, and an N-th negative electrode plate 162_N, each of which has an active material coated thereon, may be stacked. Electrode tabs 164 and 166 may be formed in (or formed from) uncoated parts of the electrode plates and may be connected to an external terminal. A separator may be interposed between a positive electrode and a negative electrode but is omitted in FIG. 6 for convenience of description.

The active material may be coated on both surfaces of each of the positive electrode plate and the negative electrode plate that are stacked. However, to increase the energy density of a battery by accommodating as many electrode plates as possible within a case, the active material may not be coated on the lateral surface of an electrode plate that is disposed at an outermost position from among the stacked electrode plates because the lateral surface of the outermost electrode plate does not influence performance of the battery because lithium ions do not move to it. The electrode plate having the active material coated on a single surface thereof may be called a half-coated electrode plate (and is not limited to being a positive electrode plate or a negative electrode plate).

In FIG. 6, the half-coated electrode plate may be the first positive electrode plate 160_1 and the N-th negative electrode plate 162_N. For example, positive electrode active material coating layers 168*a* and 168*b* may be coated on both surfaces of each of the positive electrode plates except for the first positive electrode plate 160_1. Negative electrode active material coating layers 170*a* and 170*b* may be coated on both surfaces of each of the negative electrode plates except for the N-th negative electrode plate 162_N. The lateral surfaces of electrode plates disposed at the outermost positions at both ends of the electrode assembly, that is, the first positive electrode plate 160_1 and the N-th negative electrode plate 162_N, may have uncoated surfaces 172 and 174 that are not coated.

If such a half-coated electrode plate is roll-pressed by a pair of rollers as illustrated in FIG. 5, the half-coated electrode plates curl toward the uncoated surfaces and 174.

Figure 7:
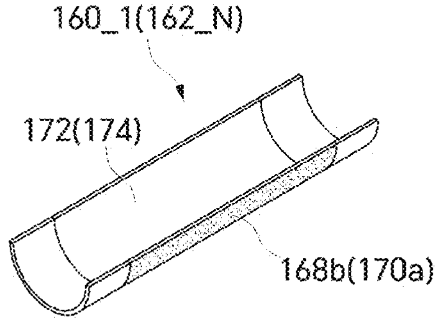
FIG. 7 illustrates a state in which a half-coated electrode plate is curled toward an uncoated surface thereof by roll-pressing.

FIG. 7 illustrates the half-coated electrode plate 160_1 or 162_N pressed by conventional roll-pressing rollers and curling toward its uncoated surface 172 or 174. The degree of curling of the electrode plate may become severe as pressure that is applied by the roll-pressing rollers is increased and may become more severe over time after the roll-pressing. Furthermore, the curling of the electrode plate may occur upon blanking or cutting in addition to roll-pressing and may become severe over time.

If an electrode assembly is assembled by using the half-coated electrode plate 160_1 or 162_N that has curled as described above, the electrode plates may be settled to a jelly roll that has been primarily manufactured by heat pressing. However, because the contraction and expansion of the electrode plate repeats due to the frequent charging and discharging of a battery during its lifespan after the battery is finally manufactured, lithium plating may occur in the electrode plate 160_1 or 162_N at the outermost sides, which has been curled (e.g., temperamentally curled). The reason for this may be that a closing failure between the electrode plate 160_1 or 162_N at the outermost sides and an electrode plate adjacent thereto occurs because there is a space between the electrode plate 160_1 or 162_N and the adjacent electrode plates, due to the contraction and expansion of the electrode plate, lithium ions not passing through the space are condensed on a surface of the adjacent electrode plate, which faces the electrode plate 160_1 or 162_N. The lithium plating may occur in both a positive electrode and a negative electrode, which may adversely affect performance and safety of the battery.

Figure 8:
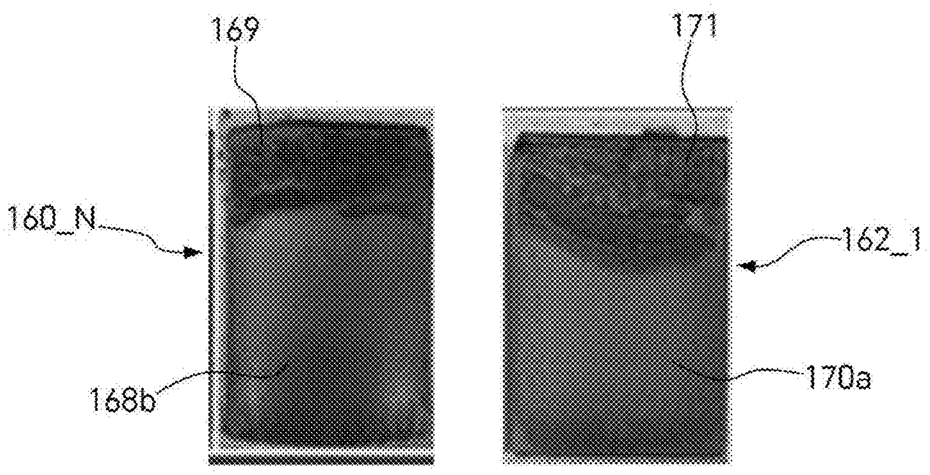
FIG. 8 is a photograph of a lithium plating phenomenon.

FIG. 8 is a photograph of an electrode plate in which a lithium plating phenomenon has occurred.

Referring to FIG. 8, during the lifespan of a manufactured secondary battery, lithium plating 171 is present on an opposite coated surface 170*a* of the negative electrode plate 162_1, which is adjacent to the coated surface 168*b* of the half-coated electrode plate 160_1 of a first positive electrode at the outermost side of the electrode assembly, and lithium plating 169 is present on the opposite coated surface 168*b* of the positive electrode plate 160_N, which is adjacent to the coated surface 170$a$ of the half-coated electrode plate 162_N of an N-th negative electrode at the outermost side of the electrode assembly on the opposite side.

Figure 9:
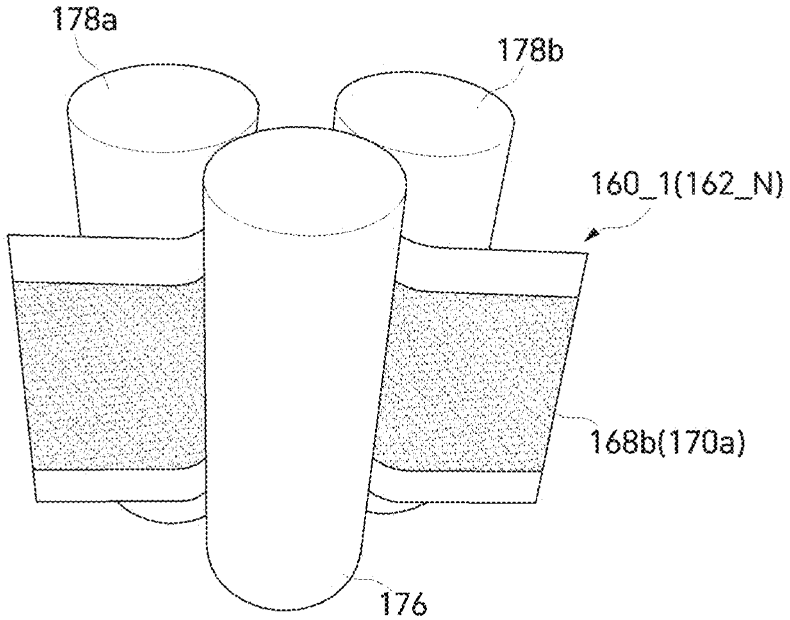
FIG. 9 illustrates an embodiment of a roll-pressing apparatus for an electrode plate according to some embodiments of the present disclosure.

FIG. 9 illustrates a roll-pressing unit capable of reducing the curling of an electrode plate according to some embodiments of the present disclosure. In a conventional roll-pressing unit, as illustrated in FIG. 5, the electrode plate P2 is roll-pressed by using two roll-pressing rollers 130. In an embodiment of the present disclosure, as illustrated in FIG. 9, the half-coated electrode plate 160_1 or 162_N may be roll-pressed by using two or more rollers 176, 178$a$, and 178$b$.

For example, the roll-pressing unit for a half-coated electrode plate according to some embodiments of the present disclosure may include a first roller 176 that neighbors (e.g., contacts or faces) the coated surface 168$b$ or 170$a$ of the half-coated electrode plate 160_1 or 162_N and second rollers 178$a$ and 178$b$ that neighbor (e.g., contact or face) the uncoated surfaces 172 and 174 of the half-coated electrode plate 160_1 or 162_N and that are differentiated from the first roller 176.

In the embodiment shown in FIG. 9, the number of first rollers 176 may be one, and the number of second rollers 178$a$ and 178$b$ may be two. Accordingly, in this embodiment, pressure applied to the coated surface 168$b$ or 170$a$ of the half-coated electrode plate 160_1 or 162_N and pressure applied to the uncoated surfaces 172 and 174 may be different from each other. Accordingly, as illustrated in FIG. 10, contrary to the usual curling direction of the electrode plate as illustrated in FIG. 7, the half-coated electrode plate 160_1 or 162_N is curled toward the coated surface 168$b$ or 170$a$ after being pressed by the roll-pressing according to embodiments of the present disclosure.

Figure 10:
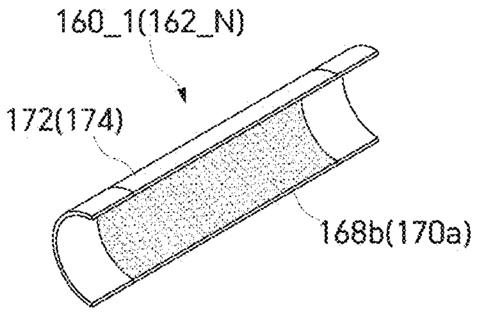
FIG. 10 illustrates a half-coated electrode plate that is curled toward a coated surface thereof by the roll-pressing apparatus according to some embodiments of the present disclosure.

As a result, the half-coated electrode plate 160_1 or 162_N may be produced as a planar electrode plate or one approximate to a plane by the roll-pressing unit because the original property of the electrode plate, which is that it is curled in a direction as illustrated in FIG. 7, may be restrained by the curling direction of the electrode plate, such as that illustrated in FIG. 10. A secondary battery that is manufactured by using an electrode plate, the curling of which has been reduced according to some embodiments of the present disclosure, may improve the performance of the battery, the lifespan of the battery, and the stability of the battery because a lithium plating phenomenon is significantly reduced during the lifespan of the battery.

Such an electrode plate curling reduction effect may be further increased by heating roll-pressing rollers by using a heater or by using heated roll-pressing that uses heated rollers compared to roll-pressing at room temperature.

In other embodiments, the differentiation between the first roller and the second roller may be in terms of temperature. For example, an electrode plate curling reduction effect having the same principle as that described with respect to FIG. 10 may be obtained by roll-pressing the half-coated electrode plate 160_1 or 162_N by applying different heating temperatures to the first roller and the second roller.

In other embodiments, the differentiation between the first roller and the second roller may be in terms of the size of the roller.

Figure 11:
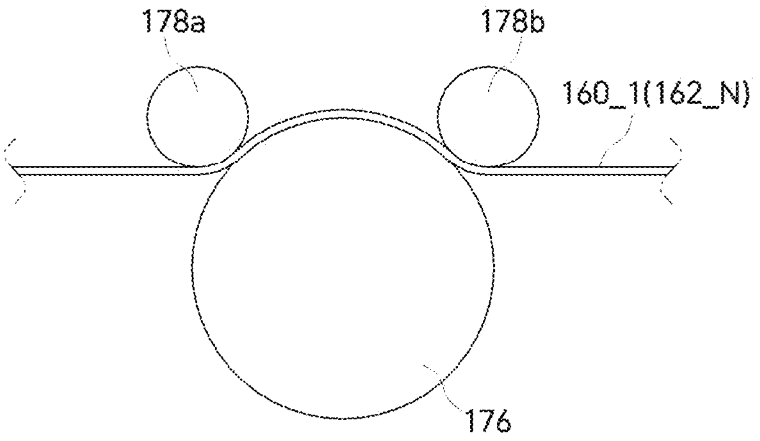
FIG. 11 is a schematic diagram of a roll-pressing apparatus in which the sizes of a first roller and a second roller are different from each other according to some embodiments of the present disclosure.

FIG. 11 is a schematic diagram of an embodiment in which the sizes of the first roller and the second roller are different from each other. The embodiment shown in FIG. 11 may be similar to the embodiment shown in FIG. 9 in that the first roller 176 includes one roller and the second roller 178$a$ and 178$b$ includes two rollers, but the size of the second rollers 178$a$ and 178$b$ may be smaller than the size of the first roller 176 in the embodiment shown in FIG. 11. A degree that the sizes of the first roller 176 and the second rollers 178$a$ and 178$b$ are different from each other may depend on a substrate, the type of an active material, or a curling degree of the half-coated electrode plate 160_1 or 162_N.

Figure 12:
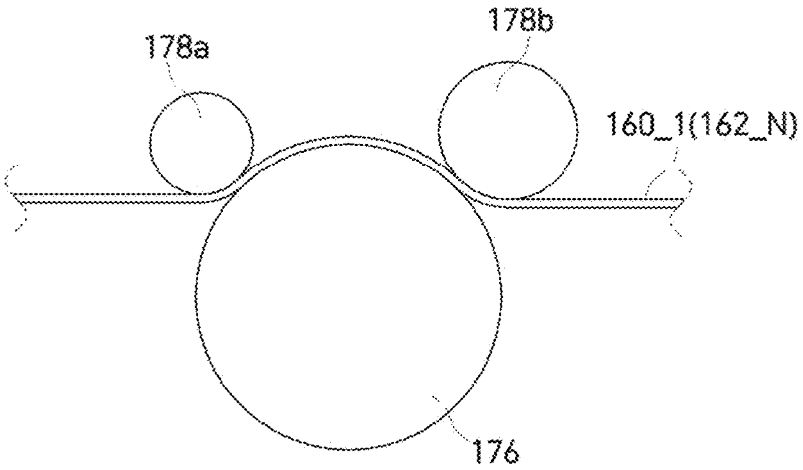
FIG. 12 illustrates a modified embodiment of the roll-pressing apparatus shown in FIG. 11.

The embodiment shown in FIG. 12 may be similar to the embodiment shown in FIG. 11 in that the first roller 176 includes one roller and the second roller 178$a$ and 178$b$ includes two rollers, but the sizes of the second rollers 178$a$ and 178$b$ may be different from each other. For example, the size of a second roller 178$b$ close to the place at which the half-coated electrode plate 160_1 or 162_N is roll-pressed and produced may be greater than the size of a second roller 178$a$ close to the place at which the half-coated electrode plate 160_1 or 162_N enters the roll pressing unit. A difference between the sizes of the rollers 178$a$ and 178$b$ may correspond to a difference in pressure. Accordingly, differentiation between pressure when the half-coated electrode plate 160_1 or 162_N enters between the first roller 176 and the second roller 178$a$ that is arranged before, from among the second rollers, and pressure when being produced between the first roller 176 and the second roller 178$b$ that is disposed behind, from among the second rollers, may be provided. Even in this embodiment, the differentiation of the sizes (or pressure according to the sizes) of the first roller 176 and the second roller 178$a$ and 178$b$ and the differentiation of the sizes (or pressure according to the size) of the second rollers 178$a$ and 178$b$ may depend on a substrate, the type of active material, or a curling degree of the half-coated electrode plate 160_1 or 162_N.

In other embodiments, the differentiation between the first roller and the second roller may be in terms of complex factors, for example, the number and sizes of rollers.

Figure 13:
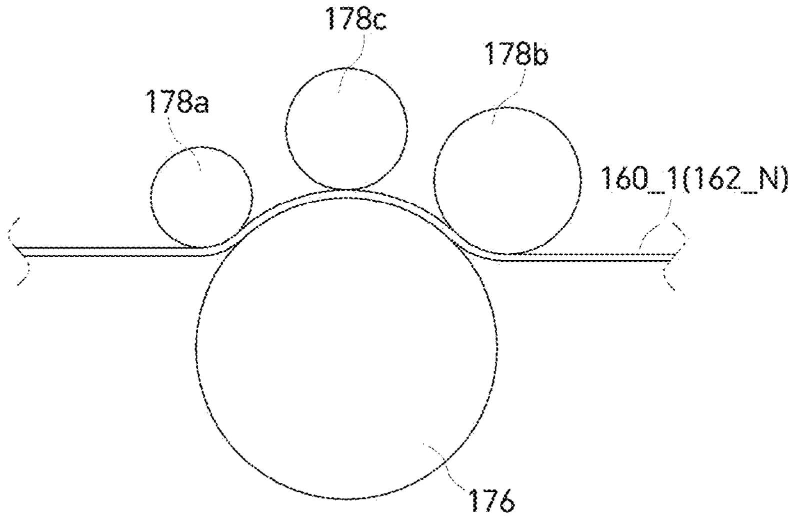
FIG. 13 is a schematic diagram of a roll-pressing apparatus in which the number and sizes of first rollers and the number and sizes of second rollers are different from each other according to some embodiments of the present disclosure.

FIG. 13 is a schematic diagram of an embodiment in which both the number and sizes of first rollers and second rollers are different from each other. In the illustrated embodiment, the first roller 176 may include one roller, and the second roller may include three rollers 178$a$, 178$b$, and 178$c$ having different sizes, each of which is smaller than the first roller 176. The number of second rollers in the embodiment shown in FIG. 13 is greater than the number of second rollers in the embodiment shown in FIG. 12, and the second rollers become larger in size in a direction in which the half-coated electrode plate 160_1 or 162_N proceeds. In this embodiment, the differentiation of the number and sizes of the first roller and the second rollers and a degree of the differentiation of the sizes of the second rollers 178$a$, 178$b$, and 178$c$ may depend on a substrate, the type of active material, or a curling degree of the half-coated electrode plate 160_1 or 162_N.

Figure 14:
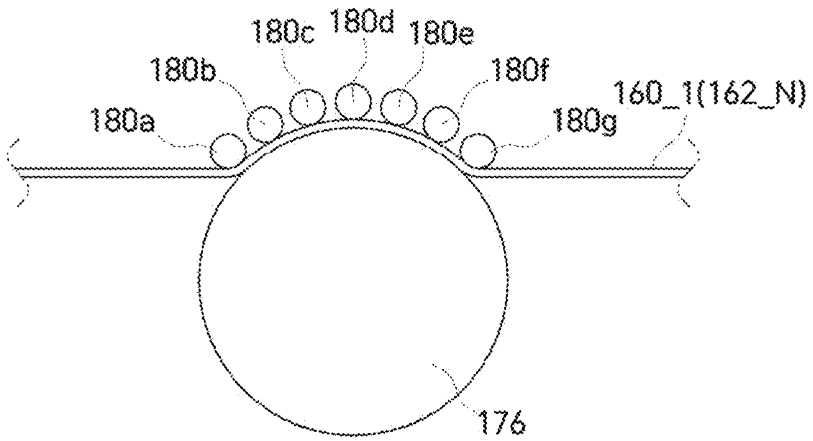
FIG. 14 is a schematic diagram of a roll-pressing apparatus in which the number of first rollers and the number of second rollers are different from each other according to some embodiments of the present disclosure.

In the embodiment shown in FIG. 14, the first roller 176 may include one roller as in the previous embodiments, but the second roller 180$a$ to 180$g$ may include seven second rollers 180$a$ to 180$g$, and the size of each of the second rollers is substantially different from the size of the first roller 176. In this embodiment, the number and sizes of the first roller 176 and the second rollers 180$a$ to 180$g$ may depend on a substrate, the type of active material, or a curling degree of the half-coated electrode plate 160_1 or 162_N.

In addition, differentiation factors between the first roller 176 and the second rollers 178$a$ and 178$b$ may include various roll-pressing conditions, for example, a gap between rollers that face each other with the half-coated electrode plate 160_1 or 162_N interposed therebetween or a distance between rollers that are disposed on the same surface of the half-coated electrode plate 160_1 or 162_N. The half-coated electrode plate 160_1 or 162_N may be roll-pressed flatly or may be roll-pressed to be curled in a direction opposite to a direction of existing roll-pressing by differentiating roll-pressing operations of the first roller 176 and the second rollers 178*a* and 178*b* from each other depending on various roll-pressing conditions. [0097]A method of manufacturing a secondary battery using the roll-pressing unit for a half-coated electrode plate according to some embodiments of the present disclosure is described herein.

The method of manufacturing a secondary battery according to some embodiments of the present disclosure may include steps of coating a mixture of materials on a substrate for manufacturing an electrode plate of an electrode assembly of a secondary battery and roll-pressing the substrate on which the mixture of materials has been coated. In the coating step, a half-coated electrode plate may be produced by coating a mixture of materials on a single surface of the substrate. In the roll-pressing step, the half-coated electrode plate may be roll-pressed by using a first roller that neighbors a coated surface of the half-coated electrode plate and a second roller that neighbors an uncoated surface of the half-coated electrode plate.

The first roller and the second roller may be differentiated from each other. Such differentiation may be in terms of temperature. For example, the half-coated electrode plate may be roll-pressed by applying different heating temperatures to the first roller and the second roller.

In other embodiments, the differentiation between the first roller and the second roller may be in terms of the relative sizes of the rollers. For example, the size of the second roller may be smaller than the size of the first roller. In such an embodiment, the size of the roller may refer to the diameter of the roller.

In other embodiments, the differentiation between the first roller and the second roller may be in terms of the number of rollers. For example, the number of second rollers may be greater than the number of first rollers. In such an embodiment, the sizes of each of the second rollers may be the same as each other. According to other embodiments, however, the sizes of the second rollers may be different from each other. Furthermore, when the sizes of the second rollers are different from each other, the size of a second roller that is disposed near to where the half-coated electrode plate is roll-pressed and produced may be greater than the size of a second roller that is disposed near to the place at which the half-coated electrode plate is supplied (e.g., enters the roll pressing unit) in order to be roll-pressed.

According to embodiments of the present disclosure, a roller that neighbors a coated surface of a half-coated electrode plate and a roller that neighbors an uncoated surface of the half-coated electrode plate are differentiated from each other in terms of number, size, and/or temperature of the rollers. Accordingly, contrary to a common curling direction of the half-coated electrode plate toward an uncoated surface thereof, a force by which the half-coated electrode plate is curled toward the coated surface may be generated. The half-coated electrode plate may be produced as a planar electrode plate or one approximate to the plane by the roll-pressing unit according to embodiment of the present disclosure. A secondary battery that is manufactured by using an electrode plate, the curling of which has been reduced, may improve the performance of the battery, the lifespan of the battery, and the stability of the battery because a lithium plating phenomenon is significantly reduced during the lifespan of the battery.

Hereinafter, suitable materials that may be usable for the secondary battery according to embodiments of the present disclosure will be described.

As the positive electrode active material, a compound capable of reversibly intercalating/deintercalating lithium (e.g., a lithiated intercalation compound) may be used. For example, at least one of a composite oxide of lithium and a metal selected from cobalt, manganese, nickel, and combinations thereof may be used.

The composite oxide may be a lithium transition metal composite oxide, and examples thereof may include a lithium nickel-based oxide, a lithium cobalt-based oxide, a lithium manganese-based oxide, a lithium iron phosphate-based compound, a cobalt-free nickel-manganese-based oxide, or a combination thereof.

As an example, a compound represented by any one of the following formulas may be used: $Li_aA_{1-b}X_bO_{2-c}D_c$ ($0.90 \le a \le 1.8$, $0 \le b \le 0.5$, $0 \le c \le 0.05$); $Li_aMn_{2-b}X_bO_{4-c}D_c$ ($0.90 \le a \le 1.8$, $0 \le b \le 0.5$, $0 \le c \le 0.05$); $Li_aNi_{1-b-c}CO_bX_cO_{2-a}D_a$ ($0.90 < a \le 1.8$, $0 \le b \le 0.5$, $0 \le c \le 0.5$, $0 < a < 2$); $Li_aNi_{1-b-c}Mn_bX_cO_{2-a}D_a$ ($0.90 \le a \le 1.8$, $0 \le b \le 0.5$, $0 \le c \le 0.5$, $0 < a < 2$); $Li_aNi_bCo_cL^1{}_dG_eO_2$ ($0.90 \le a \le 1.8$, $0 \le b \le 0.9$, $0 \le c \le 0.5$, $0 \le d \le 0.5$, $0 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $Li_{(3-f)}Fe_2(PO_4)_3$ ($0 \le f \le 2$); and $Li_aF_ePO_4$ ($0.90 \le a \le 1.8$).

In the above formulas: A is Ni, Co, Mn, or a combination thereof; X is Al, Ni, Co, Mn, Cr, Fe, Mg, Sr, V, a rare earth element, or a combination thereof; D is O, F, S, P, or a combination thereof; G is Al, Cr, Mn, Fe, Mg, La, Ce, Sr, V, or a combination thereof; and $L^1$ is Mn, Al, or a combination thereof.

A positive electrode for a lithium secondary battery may include a substrate and a positive electrode active material layer formed on the substrate. The positive electrode active material layer may include a positive electrode active material and may further include a binder and/or a conductive material.

The content of the positive electrode active material is in a range of about 90 wt % to about 99.5 wt % on the basis of 100 wt % of the positive electrode active material layer, and the content of the binder and the conductive material is in a range of about 0.5 wt % to about 5 wt %, respectively, on the basis of 100 wt % of the positive electrode active material layer.

The substrate may be aluminum (Al) but is not limited thereto.

The negative electrode active material may include a material capable of reversibly intercalating/deintercalating lithium ions, lithium metal, an alloy of lithium metal, a material capable of being doped and undoped with lithium, or a transition metal oxide.

The material capable of reversibly intercalating/deintercalating lithium ions may be a carbon-based negative electrode active material, which may include, for example, crystalline carbon, amorphous carbon, or a combination thereof. Examples of the crystalline carbon may include graphite, such as natural graphite or artificial graphite, and examples of the amorphous carbon may include soft carbon, hard carbon, a pitch carbide, a meso-phase pitch carbide, sintered coke, and the like.

A Si-based negative electrode active material or a Sn-based negative electrode active material may be used as the material capable of being doped and undoped with lithium. The Si-based negative electrode active material may be silicon, a silicon-carbon composite, $SiO_x$ (0<x<2), a Si-based alloy, or a combination thereof.

The silicon-carbon composite may be a composite of silicon and amorphous carbon. According to one embodiment, the silicon-carbon composite may be in the form of a silicon particle and amorphous carbon coated on the surface of the silicon particle.

The silicon-carbon composite may further include crystalline carbon. For example, the silicon-carbon composite may include a core including crystalline carbon and silicon particle and an amorphous carbon coating layer on the surface of the core.

A negative electrode for a lithium secondary battery may include a substrate and a negative electrode active material layer disposed on the substrate. The negative electrode active material layer may include a negative electrode active material and may further include a binder and/or a conductive material.

For example, the negative electrode active material layer may include about 90 wt % to about 99 wt % of a negative electrode active material, about 0.5 wt % to about 5 wt % of a binder, and about 0 wt % to about 5 wt % of a conductive material.

A non-aqueous binder, an aqueous binder, a dry binder, or a combination thereof may be used as the binder. When an aqueous binder is used as the negative electrode binder, a cellulose-based compound capable of imparting viscosity may be further included.

As the negative electrode substrate, one selected from copper foil, nickel foil, stainless steel foil, titanium foil, nickel foam, copper foam, conductive metal-coated polymer substrate, and combinations thereof may be used.

An electrolyte for a lithium secondary battery may include a non-aqueous organic solvent and a lithium salt.

The non-aqueous organic solvent acts as a medium through which ions involved in the electrochemical reaction of the battery can move.

The non-aqueous organic solvent may be a carbonate-based, an ester-based, an ether-based, a ketone-based, an alcohol-based solvent, an aprotic solvent, and may be used alone or in combination of two or more.

In addition, when a carbonate-based solvent is used, a mixture of cyclic carbonate and chain carbonate may be used.

Depending on the type of lithium secondary battery, a separator may be present between the first electrode plate (e.g., the negative electrode) and the second electrode plate (e.g., the positive electrode). As the separator, polyethylene, polypropylene, polyvinylidene fluoride, or a multilayer film including two or more layers thereof may be used.

The separator may include a porous substrate and a coating layer including an organic material, an inorganic material, or a combination thereof on one or both surfaces of the porous substrate.

The organic material may include a polyvinylidene fluoride-based polymer or a (meth)acrylic polymer.

The inorganic material may include inorganic particles selected from $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and combinations thereof but is not limited thereto.

The organic material and the inorganic material may be mixed in one coating layer or may be in the form of a coating layer including (or containing) an organic material and a coating layer including (or containing) an inorganic material that are stacked on each other.

Figure 15:
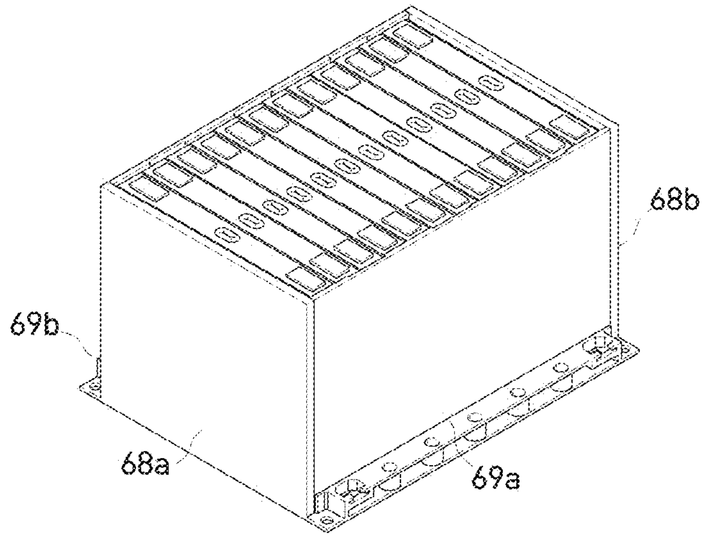
FIG. 15 is a perspective view of a secondary battery module in which secondary batteries are arranged according to one or more embodiments of the present disclosure.

FIG. 15 is an perspective view of a secondary battery module in which prismatic secondary batteries are arranged according to embodiments of the present disclosure. With the increase in secondary battery capacity for driving electric vehicles or the like, a secondary battery module may be manufactured by arranging a plurality of secondary battery cells transversely and/or longitudinally and connecting them together. The plurality of secondary batteries may be arranged in a space defined by a pair of facing end plates 68*a* and 68*b* and a pair of facing side plates 69*a* and 69*b*. The secondary batteries may be arranged in an arrangement (direction) and number to obtain desired voltage and current specifications.

Figure 16:
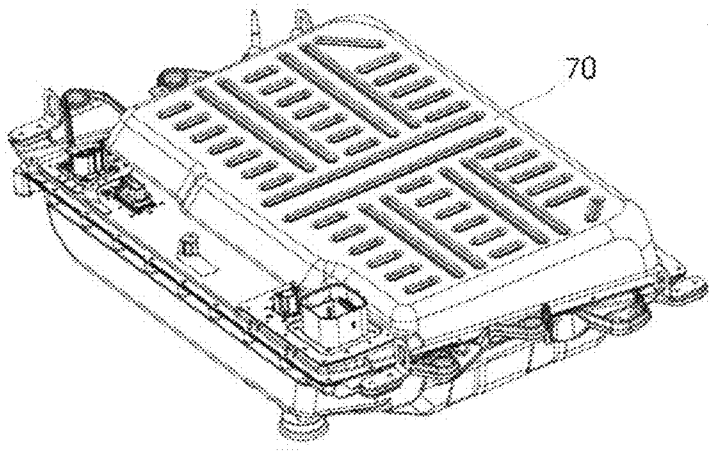
FIG. 16 is a secondary battery pack including the secondary battery module illustrated in FIG. 15 according to one or more embodiments of the present disclosure.

FIG. 16 is a perspective view of a battery pack 70 according to embodiments of the present disclosure. Referring to FIG. 16, the battery pack 70 may include an assembly to which individual batteries are electrically connected and a pack housing accommodating the same. In the drawings, for convenience of illustration, components including a bus bar, a cooling unit, external terminals for electrically connecting batteries, etc., are not shown.

Figure 17:
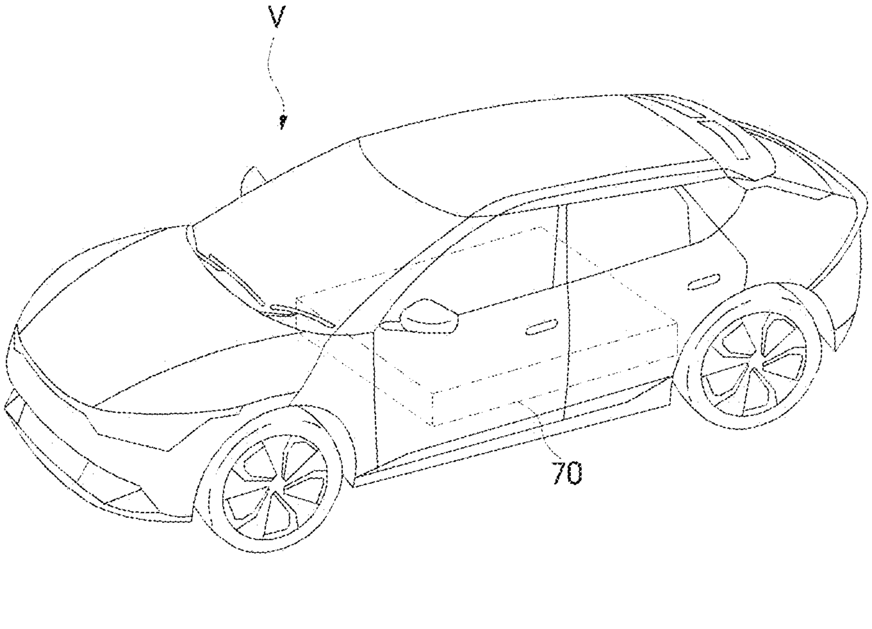
FIG. 17 is a conceptual view of a vehicle including the secondary battery pack illustrated in FIG. 16 according to one or more embodiments of the present disclosure.

The battery pack 70 may be mounted on (or in) a vehicle. The vehicle may be, for example, an electric vehicle, a hybrid vehicle, or a plug-in hybrid vehicle. The vehicle may be a four-wheeled vehicle or a two-wheeled vehicle but is not limited thereto. FIG. 17 shows a vehicle V that includes the battery pack 70 shown in FIG. 16 on the lower body thereof. The vehicle V may operate by (e.g., may be powered by) receiving power from the battery pack 70.

Although the present disclosure has been described above with respect to embodiments thereof, the present disclosure is not limited thereto. Various modifications and variations can be made thereto by those skilled in the art within the spirit of the present disclosure as defined by the appended claims and their equivalents.

DESCRIPTION OF SOME REFERENCE SYMBOLS

10: electrode assembly, 11: first electrode plate, 12: separator, 13: second electrode plate, 14: first electrode tab, 15: second electrode tab, 16: first terminal lead, 17: second terminal lead, 18: tab film, 20: pouch, 21: sealing part, 31: case, 32: cap assembly, 33: insulating plate, 34: beading part, 35: crimping part, 36: gasket, 37: first lead tab, 38: second lead tab, 40: electrode assembly, 41: first current collector, 42: second current collector, 43: first electrode tab, 44: second electrode tab, 51: case, 61: cap plate, 62: first terminal, 63: second terminal, 64: electrolyte injection hole, 65: notch, 66: vent, 67: connection member, 68*a* 68*b*: end plate, 69*a* 69*b*: side plate, 70: secondary battery pack, 110: supply roll, 120 120': coating unit, 130: roll-pressing unit, 140: winding roll, 150: transfer roller, 160_1: first positive electrode plate (half-coated electrode plate), 162_1: first negative electrode plate, 160_N: N-th positive electrode plate, 162_N: N-th negative electrode plate(the half-coated electrode plate), 168*a* 168*b*: positive electrode active material coating layer, 169: lithium plating part, 170*a* 170*b*: negative electrode active material coating layer, 171: lithium plating part, 172 174: uncoated surface, 176: first roller, 178*a* 178*b* 178*c*: second roller, 180*a*-180*g*: second roller, P1: substrate, P2: electrode plate on which a mixture of materials has been coated, P3: pressing-rolled electrode plate, V: vehicle

What is claimed is:

1. An apparatus for manufacturing a secondary battery, the apparatus comprising:

a coating unit configured to coat a mixture of materials on a substrate of an electrode plate for an electrode assembly of a secondary battery; and a roll-pressing unit configured to roll-press the substrate on which the mixture of materials has been coated, wherein the coating unit is configured to produce a half-coated electrode plate by coating the mixture of materials on only a single surface of the substrate, wherein the roll-pressing unit is configured to roll-press the half-coated electrode plate by using a first roller facing a coated surface of the half-coated electrode plate and a plurality of second rollers facing an uncoated surface of the half-coated electrode plate, wherein the first roller and the second rollers have at least one different characteristic from each other, and wherein a number of the first roller is different from a number of the second rollers, the first roller contacting the coated surface of the half-coated electrode plate and the second rollers contacting the uncoated surface of the half-coated electrode plate.

2. The apparatus as claimed in claim 1, wherein the number of the second rollers is greater than the number of the first roller.

3. The apparatus as claimed in claim 1, wherein sizes of the second rollers are identical with respect each other.

4. The apparatus as claimed in claim 1, wherein sizes of at least two of the second rollers are different from each other.

5. The apparatus as claimed in claim 1, wherein a size of one of the second rollers nearest to a location at which the half-coated electrode plate is roll-pressed is greater than a size of another one of the second rollers nearest to a location at where the half-coated electrode plate enters the roll-pressing unit.

6. The apparatus as claimed in claim 1, wherein a size of the first roller and a size of the second rollers are different from each other.

7. The apparatus as claimed in claim 6, wherein the size of the second rollers is smaller than the size of the first roller.

8. The apparatus as claimed in claim 1, wherein a temperature of the first roller and a temperature of the second rollers are different from each other.

* * * * *